April 6, 1965  G. P. BUTTERBAUGH ETAL  3,176,810
COMPACT CENTRIFUGAL AND ONE-WAY CLUTCHES
WITH INTERNAL OIL RESERVOIR
Filed Nov. 13, 1961  2 Sheets-Sheet 1

INVENTORS
GALEN P. BUTTERBAUGH,
LOUIS C. GALLEHER
BY THEIR ATTORNEYS
HARRIS, KIECH, RUSSELL & KERN

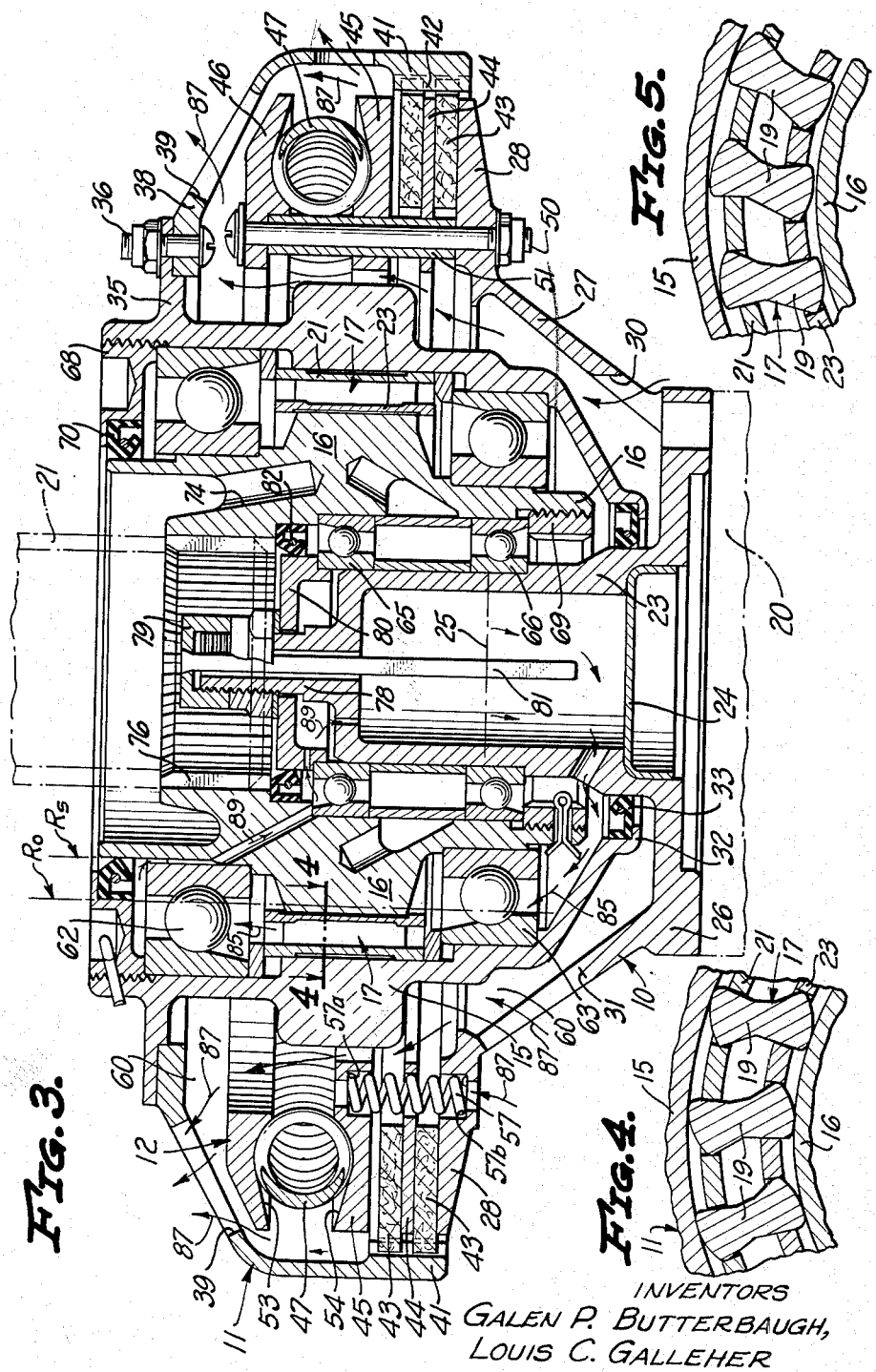

United States Patent Office 3,176,810
Patented Apr. 6, 1965

3,176,810
COMPACT CENTRIFUGAL AND ONE-WAY
CLUTCHES WITH INTERNAL OIL RESERVOIR
Galen P. Butterbaugh, Lynwood, and Louis C. Galleher,
Long Beach, Calif., assignors to Salsbury Corporation,
Los Angeles, Calif., a corporation of California
Filed Nov. 13, 1961, Ser. No. 151,711
7 Claims. (Cl. 192—48)

The present invention relates to clutches and, more particularly, to a device serving both as an automatic engaging clutch and as a one-way or sprag clutch.

Automatic engaging clutches, usually of the centrifugal-actuated type, are commonly used in power transmission designs. In automatic clutches of this type, a centrifugally-actuated means or other suitable means is provided for coupling a driving rotary member to a driven rotary member when the rotational speed of the driving member exceeds a predetermined value. Clutches of this type are illustrated in Patent No. 2,260,796 to Bruce Burns and in Patent No. 2,976,975 to Lewis D. Thostenson and Louis C. Galleher. Sprag clutches, sometimes described as overrunning or one-way clutches, are less widely used but find application in some power transmission designs, for example in helicopters, where they are used in combination with an automatic clutch. A sprag clutch has a sprag element which serves to connect a driving rotary member to a driven rotary member upon rotation of the former member in one direction of rotation. The sprag element disconnects the driven member from the driving member upon reverse rotation of the driven rotary member to the normal direction of rotation of the driving member. The sprag clutch incorporated in a helicopter power transmission train permits free revolving of the propeller during descent of the helicopter following a power failure.

In designs requiring an automatic clutch and a sprag clutch the two clutches are commonly spaced apart. For example, in a conventional helicopter design the sprag clutch is located within the helicopter transmission housing and is lubricated by transmission oil. This arrangement has not proven fully satisfactory, primarily because the size of the sprag clutch is greatly restricted due to space limitations. Service maintenance of a sprag clutch so located requires dismantling of the complete transmission.

It is, therefore, a primary object of this invention to provide a composite clutch assembly serving both as an automatic clutch and as a sprag or one-way clutch. Another object is to provide a self-contained lubricating system designed for lubrication of the sprag during operation.

A further object of the invention is to provide a clutch of the foregoing design having means for dissipating frictionally-generated heat resulting from slippage of the automatic clutch, thus protecting the sprag clutch area of the composite clutch from overheating. A still further object of the invention is to provide a compact and reliable composite clutch design which will reduce the space normally required for separate sprag and automatic clutches.

A still further object is to provide a design having sufficient ruggedness to handle the oscillating loads inherent in helicopter service without deterioration over the desired life between service periods. Another object is to provide a composite clutch design which may be maintained without need for special tools or extraordinary mechanical skill. Another object of the invention is to provide a design which facilitates maintaining of the composite clutch at a desirable low operating temperature by dissipating frictionally-generated heat from various portions of the clutch.

Another object is to provide novel mechanical details for accomplishing the foregoing objects.

Other objects and advantages will appear from the following specification and the drawings, in which:

FIG. 3 is a sectional view taken along line 3—3 of FIGS. 1 and 2;

FIG. 4 is a fragmentary sectional view taken along line 4—4 of FIG. 3, illustrating the sprag element of the clutch assembly in its engaged position; and FIG. 5 is a fragmentary sectional view showing the sprag element of FIG. 4 in its disengaged or unloaded position.

Figure 1:
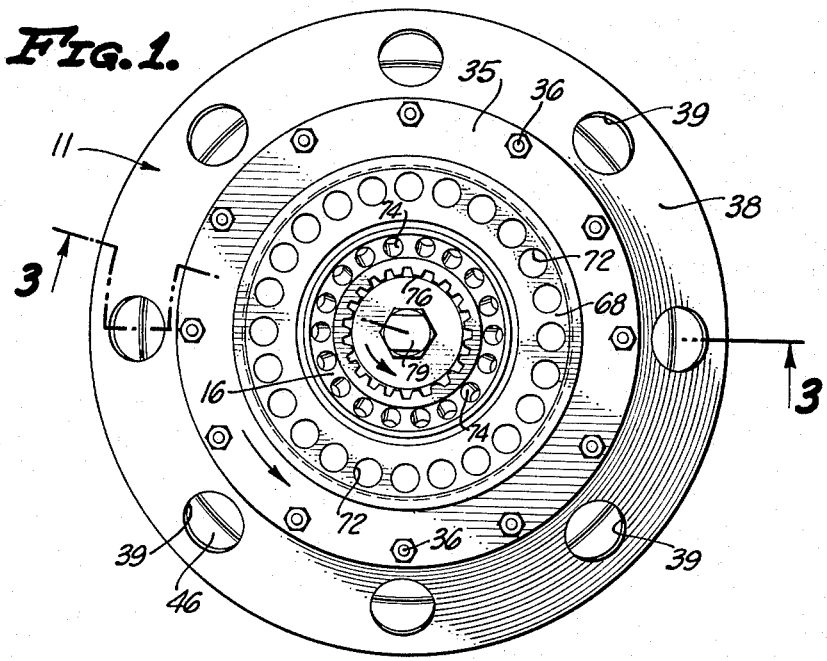
FIG. 1 is a top view of a preferred embodiment of the clutch assembly of the invention.

The composite clutch assembly of the invention incorporates features of an automatic centrifugally-actuated clutch and a sprag or overrunning clutch. The automatic portion of the clutch assembly includes a driving member 10 which serves as the clutch backplate, a driven member 11 which acts as the clutch housing, and a coupling means 12 which is designed to transmit rotation of the driving member 10 to the driven member 11 when rotational speed of the driving member exceeds a predetermined value. The driven rotary member 11 has an inner, irregular, generally annular wall 15 which encloses an inner space centrally of the clutch. The enclosed inner space, which houses several components of the clutch hereinafter described, has its longitudinal axis lying along the axis of rotation of the driving and driven rotary members 10 and 11.

The sprag portion of the composite clutch of the invention has for its driving member the aforementioned driven member 11 of the automatic clutch portion. More exactly speaking, the driving member of the sprag element is the annular wall 15 of the driven member 11. The driven member of the sprag element is a third rotary member 16 which is coaxially associated with the other two rotary members 10 and 11 and disposed within the space enclosed by the annular wall 15 of the driven member 11. A sprag element 17 is disposed between the third rotary member 16 and the encircling driven rotary member 11. The sprag element 17 which conveniently takes the form of rods or other known sprag means couples the third rotary member 16 to the driven rotary member 11 upon rotation of the latter. The sprag element 17 disconnects the third rotary member 16 from the driven member 11 upon rotation of the third member in counterdirection to the normal direction of rotation of the driving and driven rotary members 10 and 11. The term sprag is used throughout to include all types of "one way" or "overrunning" clutches.

The sprag element 17 in the embodiment illustrated is the familiar double-cage full-phasing sprag clutch comprising several elongated sprag rods 19 of irregular dumbbell cross section positioned between an outer cage 21 and an inner cage 23. The rods 19 are shaped in cross section to engage or lodge between the third rotary member 16 and the annular wall 15 of the driven member 11 in the clutch load position of FIG. 4. The sprag rods 19 in the free wheeling position of FIG. 5 are free of the inner and outer cages 23 and 21, disconnecting the third rotary member 16 from the driven member 11.

The driving member 10 of the automatic clutch portion is mounted on an engine crankshaft flange 20 indicated in phantom lines in FIG. 3. The sprag clutch portion of the composite clutch of the invention connects to a shaft 21 indicated in phantom lines; for example, a propeller shaft of a helicopter.

The driving member 10, which serves as the backplate for the composite clutch, has an upwardly-extending centrally-located hub 23 which extends into the inner space enclosed by the annular wall 15 of the driven member. The hub 23 is hollow and is closed at its lower end by an inverted pan member 24, thus providing an oil reservoir in the interior of the hub. Oil fills the oil reservoir (when the clutch is not moving) to an oil line 25 which is approximately midway between the ends of the reservoir. When the composite clutch is rotating, the oil is moved outwardly of the reservoir under influence of centrifugal force to areas of the clutch hereinafter discussed forming, so to speak, a rotating oil annulus. Passageways indicated by arrows 89 provide for air displacement back to the reservoir when the oil moves into the sprag area. This provision prevents excessive pressure on the seals and maintains substantially uniform atmospheric pressure within the self-lubricating system.

Figure 2:
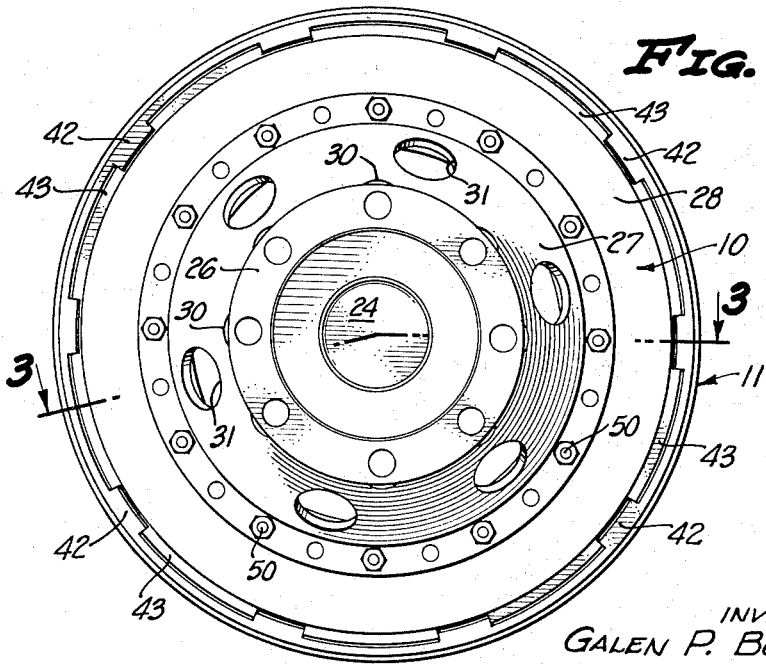
FIG. 2 is a bottom view of the clutch assembly of FIG. 1.

The driving member 10 has an annular lower flange portion 26 adjacent the engine crankshaft flange 20. A web portion 27 extends upwardly and outwardly from the lower flange portion 26, which web portion 27 terminates in a radially extending annular clutch element 28. The clutch element 28 forms the outer periphery of the driving member 10 and cooperates with the means 12 automatically coupling the driving and driven members 10 and 11. As seen in FIGS. 2 and 3, the web portion 27 carries a series of ventilating ports 30 immediately adjoining the lower flange 26 and a second series of ventilating ports 31 along its length near the annular clutch element 28.

The driven member 11 which encloses the upper side of the composite clutch assembly (serving as a housing in this respect) has the aforementioned irregularly-shaped annular wall 15 which extends from adjacent the top of the composite clutch and terminates at its lower end in an inwardly-extending annular flange 32 which closely encircles the hub 23 adjacent the hub's lower end. An annular oil seal 33 conventional in design closes the gap between the annular flange 32 and the hub 23. The annular wall 15 of the driven member 11 at its upper end has a radially extending and outwardly reaching flange 35 which is held by circles of spaced bolts 36 to a rim portion 38. The rim portion 38 extends downwardly and outwardly from the bolts 36 presenting a sloping surface which contains a series of equally spaced ventilation ports 39. The sloping surface of the rim portion 38 terminates in an axially extending peripheral flange 41. Disposed radially inwardly of and riveted, or otherwise secured to the flange 41 of the driven member 11 are several keys 42 (FIG. 2) which are disposed in notches in the outer peripheries of a pair of annular clutch elements 43. The clutch elements 43 are made of conventional friction clutch material. One of the friction clutch elements 43 is placed between the annular clutch element 28 of the driving member 10 and a metallic clutch element 44. The other friction clutch element 43 is disposed between the aforementioned metallic clutch element 44 and a pressure plate 45. The pressure plate 45 is separated from a ramp plate 46 by a circular garter spring 47. As best seen in FIG. 3, the ramp plate 46, the pressure plate 45, and the metallic clutch element 44 are held by several bolts 50 and bushings 51 to the annular clutch element 28 of the driving member 10. Thus it is seen that the foregoing elements which are bolted to the driving member 10 will rotate with that member. The two friction clutch elements 43 which are keyed to the driven member 11 will rotate with the latter.

The garter spring 47 is seated in dished-out areas 53 and 54 respectively of the ramp plate 46 and pressure plate 45. When the driving member 10 is rotated at a speed in excess of a predetermined value, centrifugal force causes the garter spring 47 to expand radially and tend to wedge between the pressure plate 45 and ramp plate 46 at the outer peripheral edges of their respective dished-out areas 53 and 54. Such expansion and consequent wedging of the garter spring 47 result in axial movement of the pressure plate 45, with eventual frictional engagement of the several clutch elements including the two friction clutch elements 43, the metallic clutch element 44 and the annular clutch element 28 of the driving member 10, to couple the driven member 11 to the driving member 10. When the speed of the driving member 10 is reduced below the predetermined minimum at which the garter spring 47 is effective to energize the several clutch elements, the frictional engagement that may exist between the various clutch elements is insufficient to transmit rotation to the driven member 11.

To insure disengagement of the several clutch elements when the driving member 10 is rotating at a speed less than the critical one, several coil springs 57, acting in the axial direction to bias the annular clutch element 28 of the driving member 10 and pressure plate 45 away from each other, are provided. One end of each spring 57 is seated in the bottom of a recess 57a in the pressure plate 45 and the other end thereof is seated against the bottom of an aligned recess 57b in the annular clutch element 28. Consequently, the springs 57 act to bias the pressure plate 45 away from engagement by the adjoining friction clutch element 43. The recesses 57a and 57b have small holes permitting circulation of cooling air therethrough.

It is important to the successful operation of the composite clutch assembly of the invention that ventilating means be provided for removing heat generated from slippage of the various clutch elements of the automatic centrifugal clutch portion to protect the automatic clutch area from damage by excess temperature and also to carry away heat from the area surrounding the sprag clutch portion and its lubricating system. The ventilating means includes an air space 60 between the annular wall 15 of the driven rotary member 11 and the driving member 10 or, more exactly speaking, between the annular wall 15 and the centrifugally-actuated coupling means 12 including the several clutch elements. Thus it is seen that the sprag clutch portion of the composite clutch is insulated by an air space from the automatic clutch portion, except for the little heat that might be transmitted through the wall of driving member 10 or the wall of driven member 11. Both of the latter members are of relatively thin section and therefore the heat for the most part will dissipate before it reaches the sprag clutch area. The paths of circulation of air through the automatic clutch portion are indicated by arrows 87.

It will be seen that the design of the composite clutch assembly of the invention provides a relatively large space for the sprag clutch components. The driven rotary member 11 of the automatic clutch portion which serves also as the driving member of the sprag clutch portion is journalled to the third rotary member 16 (which is the driven member of the sprag clutch) by means of two ball bearing assemblies 62 and 63 which are disposed at the opposite ends of the sprag element 17. The third rotary member 16 in turn is journalled to the upwardly extending hub 23 of the automatic clutch driving member 10 by spaced ball bearing assemblies 65 and 66 which assure proper alignment and location of the various component members. The component members are held in assembled form by a keeper nut 68, that bears down on the upper surface of the ball bearing assembly 62, and by a smaller keeper nut 69 that threads into a lower portion of the third rotary member 16, bearing against the lower ball bearing assembly 66. The upper keeper nut 68 threads into the top of the driven member 11. An annular flexible oil seal 70 is placed between the upper end of the third rotary member 16 and the keeper nut 68, in which location the keeper nut may be viewed as an inwardly extending flange of the driven rotary member 11. The keeper nut 68 on its outer surface carries a ring of weight-relieving holes 72 which may be used for engagement with a suitable wrench in the positioning of the keeper nut. The oil seal 70 is located inwardly of the sprag element 17. With this location of the oil seal 70 the radius ($R_o$) to the inside periphery of the rotating oil annulus is greater than the radius ($R_s$) of the sealing surface. Therefore, pressure due to centrifugal force acting upon the oil is not transmitted to the sealing surface of the oil seal 70. The passageways connecting the oil reservoir of the sprag element 17 and ball bearing assemblies are indicated by arrows 85 in FIG. 3.

The outer end of the third rotary member 16 is recessed and the recessed area is provided with a ring of weight-relieving holes 74 which surround a short tubular internally splined hub 76 into which the propeller shaft 21 is fitted.

The upper end of the hub 23 of the driving member 10 carries an integral upwardly-extending boss 78, whose upper end is threaded to receive a dip-stick cap 79. The cap 79 carries a dip-stick 81 that extends through a central hole in the boss 78 into the reservoir of oil contained within the hub 23. It will be noted that the underside of the dip-stick cap rests on a round retainer member 80 which bears against the upper end of the ball bearing assembly 65. An oil seal 82 is provided between the retainer member 80 and an internal shoulder of the third rotary member 16. The clutch of the invention may be used either in the vertical position illustrated or in a horizontal position in which latter position the oil forms, as in the other position, a rotating oil annulus in operation of the clutch.

Although an exemplary embodiment of the invention has been disclosed herein for purposes of illustration, it will be understood that various changes, modifications, and substitutions may be incorporated in such embodiment without departing from the spirit of the invention as defined by the claims which follow.

We claim:

1. In a clutch assembly, the combination of:
coaxial driving and driven rotary members, said driven rotary member having an annular wall enclosing an inner space centrally of the clutch assembly, which inner space has a longitudinal axis along the axis of rotation of said rotary members;
centrifugally-actuated means for coupling the two rotary members together when rotational speed of the driving member exceeds a predetermined value;
a third rotary member disposed within said inner space and having an axis of rotation coincident with the other two rotary members, said third rotary member having a central cavity whose longitudinal axis coincides with the axis of rotation;
a sprag element disposed between said third rotary member and said driven rotary member; and
an oil reservoir disposed within the central cavity of the third rotary member, said oil reservoir being connected by a passageway extending outwardly therefrom to the sprag element.

2. In a clutch assembly, the combination of:
coaxial driving and driven rotary members, said driven rotary member having an annular wall enclosing an inner space centrally of the clutch assembly, which inner space has a longitudinal axis along the axis of rotation of said rotary members;
centrifugally-actuated means for coupling the two rotary members together when rotational speed of the driving member exceeds a predetermined value;
a third rotary member disposed within said inner space and having an axis of rotation coincident with the other two rotary members, said third rotary member having a central cavity whose longitudinal axis coincides with the axis of rotation;
a sprag element disposed between said third rotary member and said driven rotary member; and
said driving rotary member having a cylindrical hub reaching into the central cavity of the third rotary member with the longitudinal axis of the hub coinciding with the longitudinal axis of said third rotary member, said hub providing an inner bearing support for said third rotary member.

3. A clutch in accordance with claim 2 wherein the cylindrical hub of the driving rotary member contains an oil reservoir and wherein there is a passageway extending outwardly from the reservoir to the sprag element.

4. A clutch in accordance with claim 2 wherein anti-friction bearings are respectively disposed between the driven and third rotary members and between the third rotary member and the cylindrical hub, and wherein said cylindrical hub contains an oil reservoir with passage means extending outwardly from the oil reservoir to the sprag element and said anti-friction bearings.

5. In a clutch assembly, the combination of:
coaxial driving and driven rotary members, said driven rotary member having an annular wall enclosing an inner space centrally of the clutch assembly, which inner space has a longitudinal axis along the axis of rotation of said rotary members;
centrifugally-actuated means for coupling the two rotary members together when rotational speed of the driving member exceeds a predetermined value;
a third rotary member disposed within said inner space and having an axis of rotation coincident with the other two rotary members, said third rotary member having a central cavity whose longitudinal axis coincides with the axis of rotation;
said driving rotary member having a cylindrical hub reaching into the central cavity of the third rotary member with the longitudinal axis of the hub coinciding with the longitudinal axis of said third rotary member, said hub providing a bearing support for the third rotary member;
a sprag element disposed between said third rotary member and said driven rotary member;
a lubricating system including an oil reservoir contained within the cylindrical hub and passageways extending outwardly from the reservoir to the sprag element; and
ventilating means for removing heat generated in the area of the driving and driven rotary members, said ventilating means including an air space between the annular wall of the driven rotary member and the centrifugally-actuated coupling means, and passage means permitting passage of atmospheric air into and out of said air space.

6. In a clutch assembly, the combination of:
coaxial driving and driven rotary members, said driven rotary member having an annular wall enclosing an inner space centrally of the clutch assembly, which inner space has a longitudinal axis along the axis of rotation of said rotary members;
centrifugally-actuated means for coupling the two rotary members together when rotational speed of the driving member exceeds a predetermined value;
a third rotary member disposed within said inner space and having an axis of rotation coincident with the other two rotary members, said third rotary member having a central cavity whose longitudinal axis coincides with the axis of rotation;
a sprag element disposed between said third rotary member and said driven rotary member;
an oil reservoir disposed within the central cavity of the third rotary member and a passageway extending outwardly from the oil reservoir to the sprag element; and
ventilating means provided for removing heat generated in the area of the driving and driven rotary members, said ventilating means including an air space between the annular wall of the driven rotary member and the centrifugally-actuated coupling means, and passage means permitting passage of atmospheric air into and out of said air space.

7. In a clutch assembly, the combination of:
coaxial driving and driven rotary members, said driven rotary member having an inwardly extending portion and an annular wall enclosing an inner space centrally of the clutch assembly, which inner space has a longitudinal axis along the axis of rotation of said rotary members;
centrifugally-actuated means for coupling the two rotary members together when rotational speed of the driving member exceeds a predetermined value;
a third rotary member disposed within said inner space and having an axis of rotation coincident with the other two rotary members, said third rotary member having a central cavity whose longitudinal axis coincides with the axis of rotation;
a sprag element disposed between said third rotary member and said driven rotary member;
a lubricating system including an oil reservoir disposed within the central cavity of the third rotary member and passageways connecting the oil reservoir with the sprag element; and
an annular flexible oil seal placed between the third rotary member and the inwardly extending portion of the driven rotary member, said oil seal being located inwardly of the sprag element and having an exterior surface exposed to the atmosphere and a second surface exposed to a passageway of the lubricating system.

References Cited by the Examiner
UNITED STATES PATENTS

| | | | |
|---|---|---|---|
| 367,090 | 7/87 | Brown | 192—113 |
| 1,742,804 | 1/30 | Carhart | 192—113.1 |
| 1,960,512 | 5/34 | Roos et al. | 192—113 |
| 2,230,293 | 2/41 | Harris | 192—48 XR |
| 2,581,637 | 1/52 | Danly et al. | 192—113.1 |
| 2,682,942 | 7/54 | Thunstrom et al. | 192—48 |
| 2,694,937 | 11/54 | Birbaum | 192—48 XR |
| 2,976,975 | 3/61 | Thostenson et al. | 192—105 XR |

DAVID J. WILLIAMOWSKY, *Primary Examiner.*
THOMAS J. HICKEY, *Examiner.*